April 28, 1942.  R. F. EDDY ET AL  2,280,810
VENDING MACHINE
Filed July 12, 1939  6 Sheets-Sheet 3
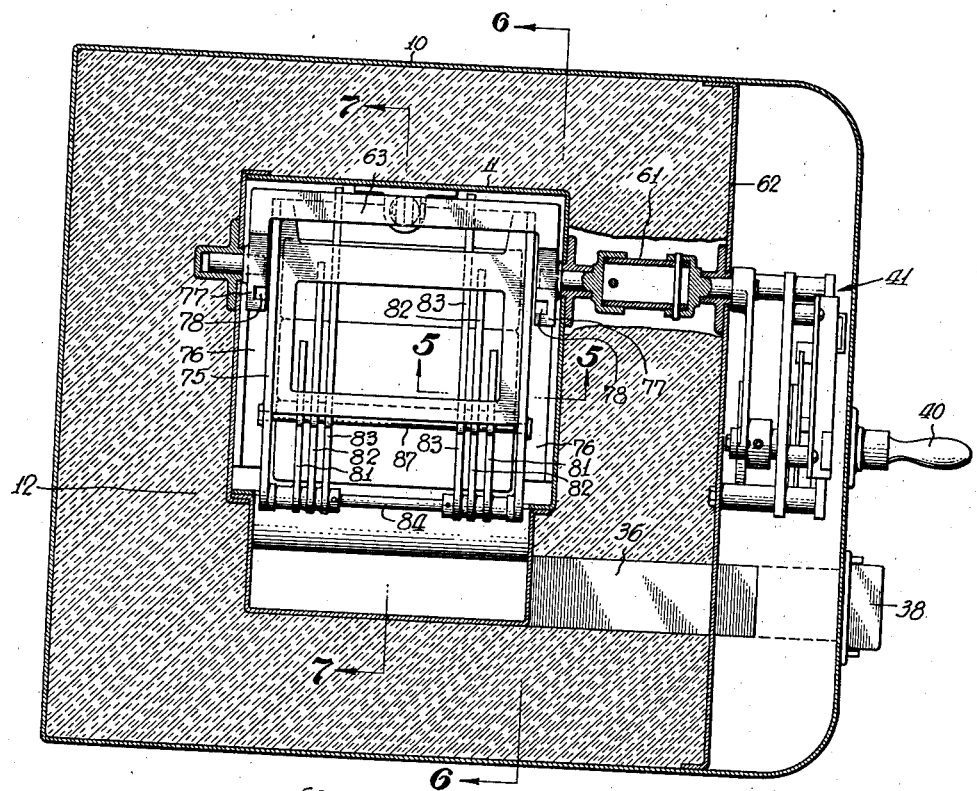
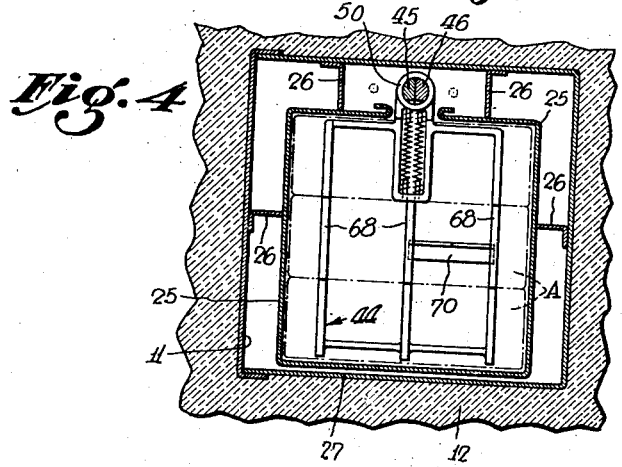
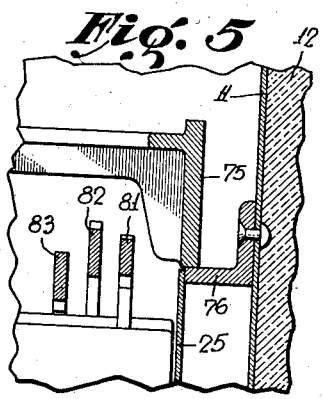
INVENTORS
ROBERT F. EDDY
EMIL W. MOELLER
RALPH R. WILCOX
ALLAN F. EDDY
ATTORNEY

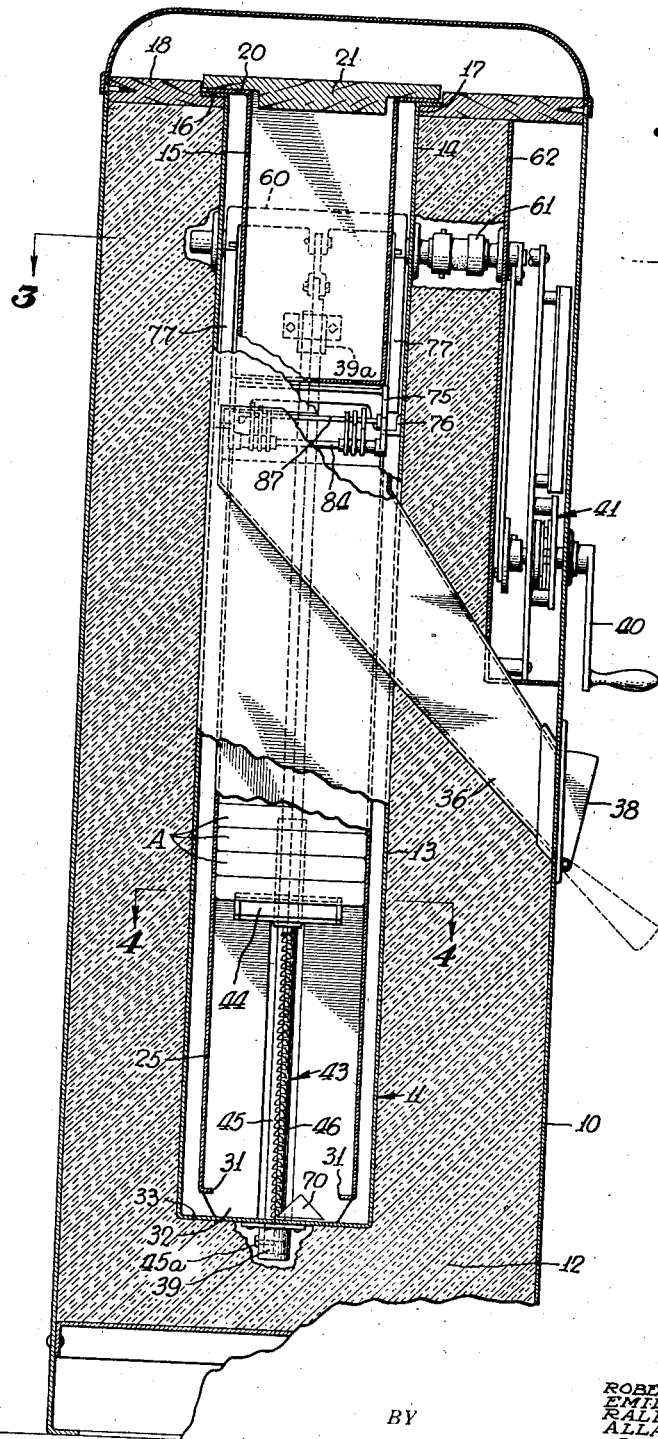

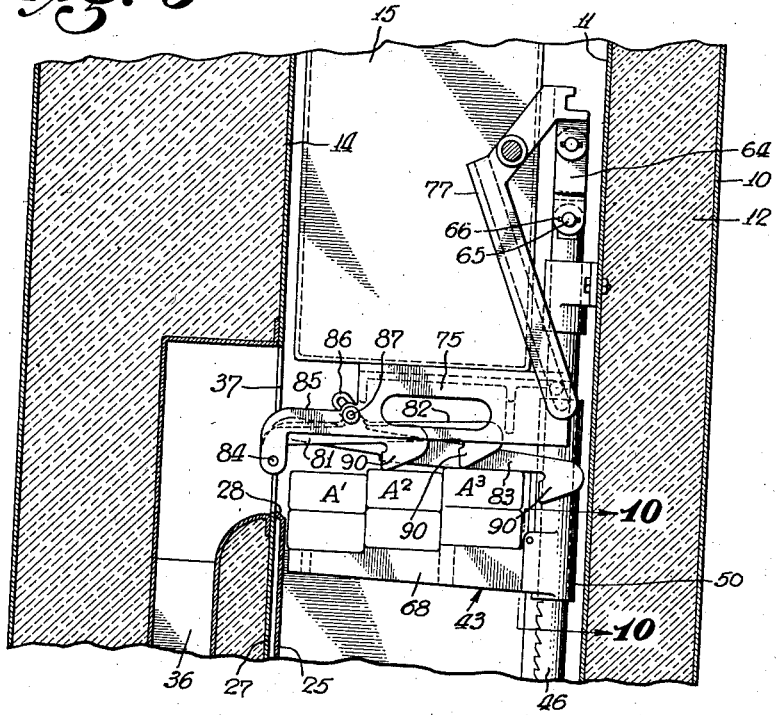
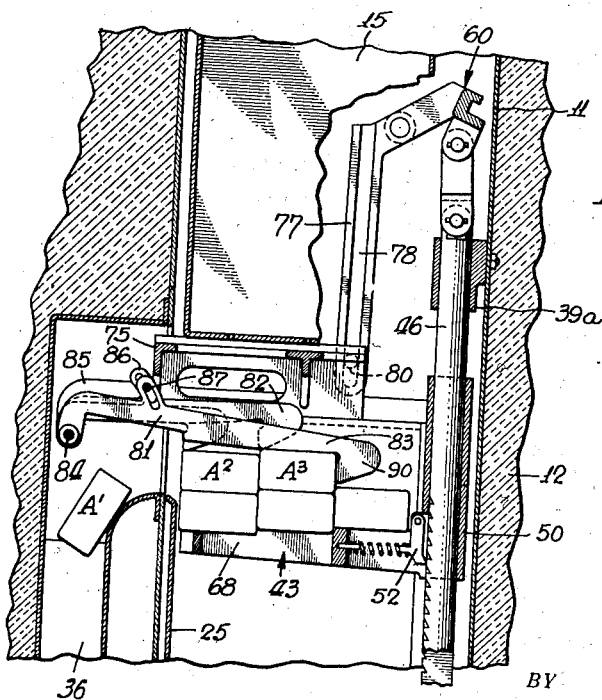

April 28, 1942.                R. F. EDDY ET AL                2,280,810
                               VENDING MACHINE
                             Filed July 12, 1939            6 Sheets-Sheet 5
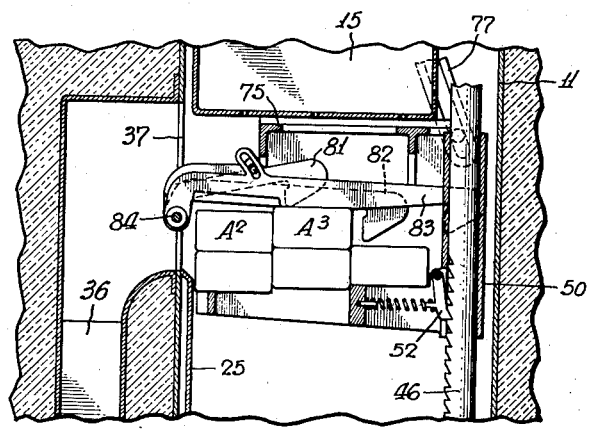
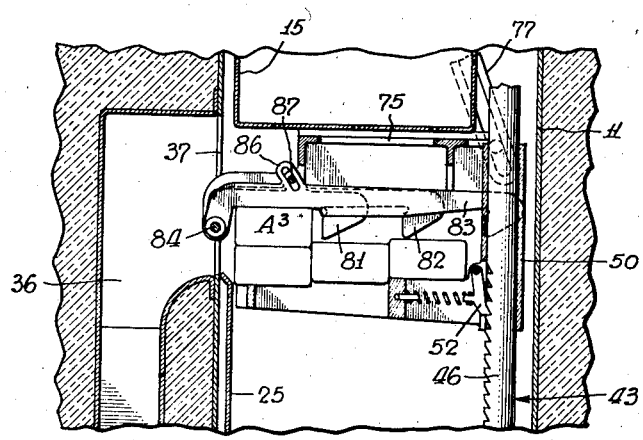
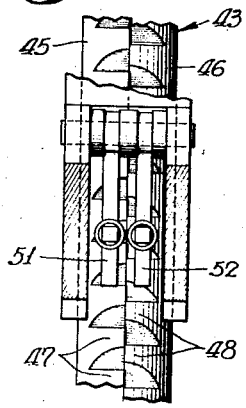
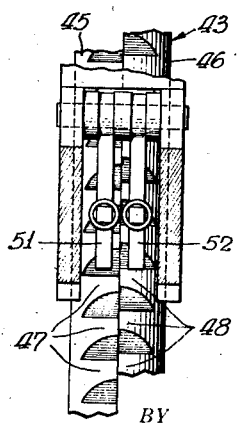
INVENTORS
ROBERT F. EDDY
EMIL W. MOELLER
RALPH R. WILCOX
ALLAN F. EDDY
BY
ATTORNEY April 28, 1942.  R. F. EDDY ET AL  2,280,810

VENDING MACHINE

Filed July 12, 1939  6 Sheets-Sheet 6

INVENTORS
ROBERT F. EDDY
EMIL W. MOELLER
RALPH R. WILCOX
ALLAN F. EDDY

BY Richard J. Cowling
ATTORNEY

Patented Apr. 28, 1942

2,280,810

UNITED STATES PATENT OFFICE 2,280,810

VENDING MACHINE

Robert F. Eddy, Emil W. Moeller, Ralph R. Wilcox, and Allan F. Eddy, South Pasadena, Calif.

Application July 12, 1939, Serial No. 283,946

13 Claims. (Cl. 312—36)

The present invention relates to vending or dispensing machines, especially for use in handling refrigerated articles such as frozen confections or frozen food products.

One object of the present invention is to provide a machine of this general type, which maintains the refrigeration efficiency at a maximum, and which allows a minimum loss of refrigeration, thereby affording low operating cost.

Another object is to provide a vending machine of the general type referred to, which can be easily and expeditiously replenished with packages or articles to be dispensed.

A further object is to provide a vending machine of the general type referred to, in which replenishment of the refrigerant can be effected with facility and dispatch.

Another object is to provide in a vending machine of the above class a structural arrangement of the various compartments and operating mechanisms, resulting in economy of space, while affording a maximum amount of storage room for the vendible packages.

Another object is to provide a new and improved package expelling mechanism, simple and reliable in operation, occupying a minimum amount of space, and capable of operating on a multiple stack column of packages, for expelling said packages successively.

Figure 1:
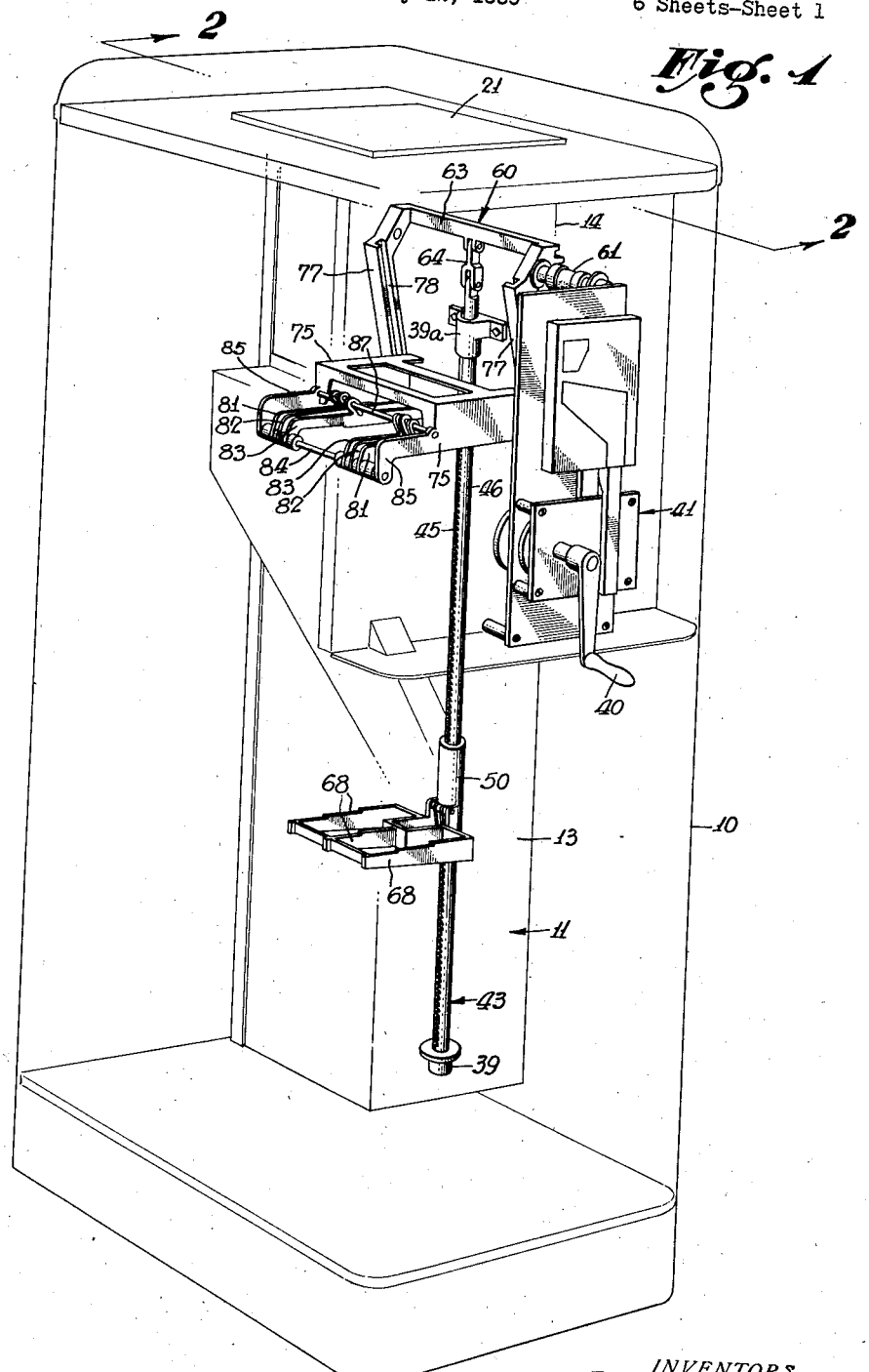
Figure 12:
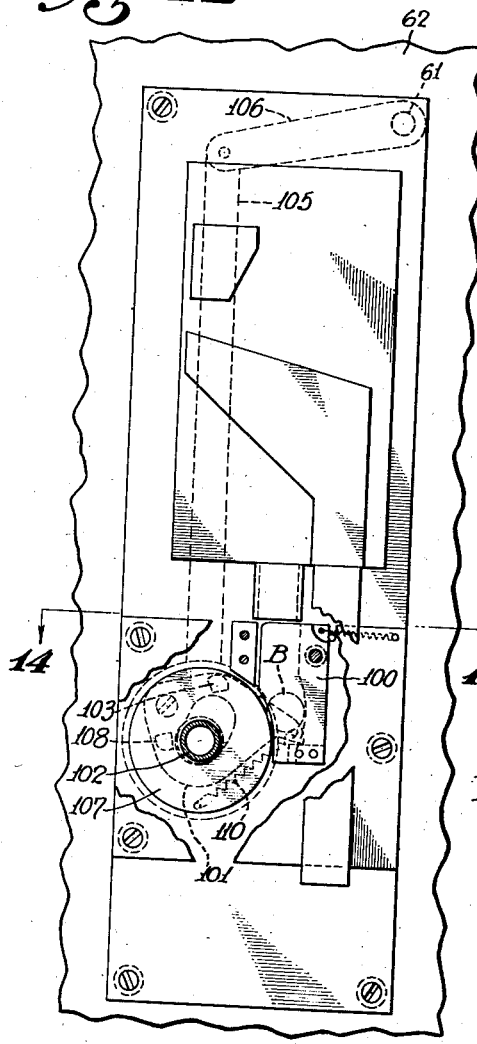
Figure 13:
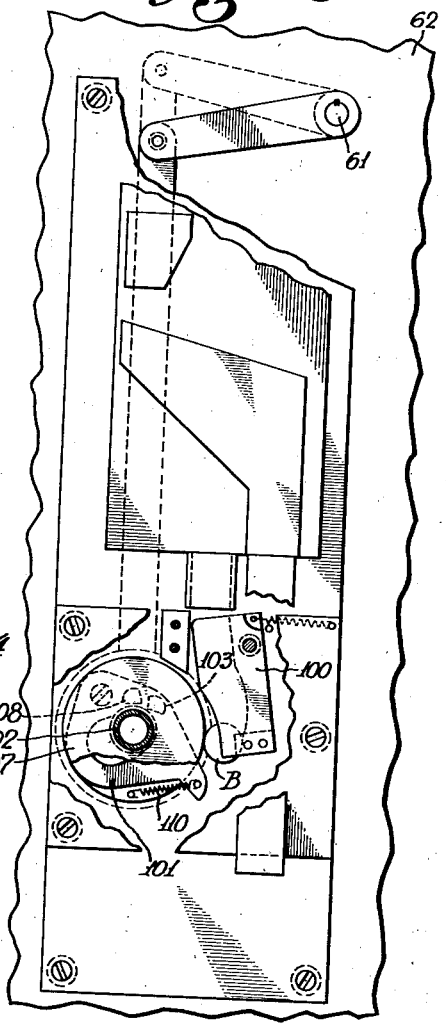
Figure 14:
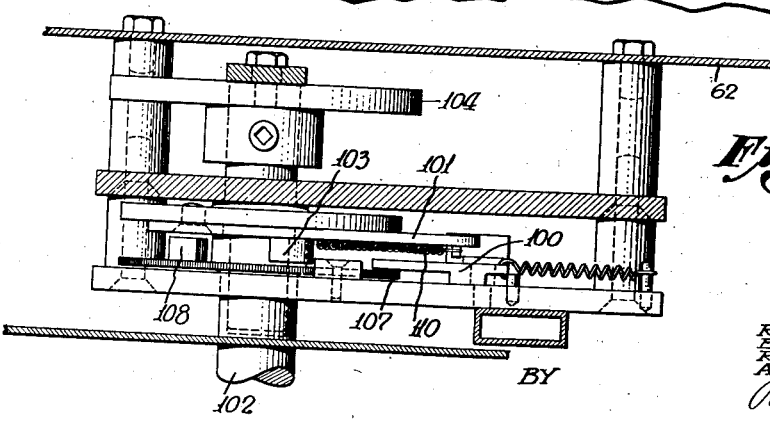

Various other objects and advantages of the invention will be apparent from the following particular description, and from an inspection of the accompanying drawings, in which:

Fig. 1 is a perspective of a form of vending machine, embodying the present invention, two adjacent walls of the outer cabinet being shown removed, and part of the refrigerant and package storage receptacle being shown broken away to more adequately show the construction, Fig. 2 is a longitudinal section of the machine taken on line 2—2 of Fig. 1, parts being shown in elevation and other parts broken away, Figs. 3 and 4 are transverse sections taken on lines 3—3 and 4—4 respectively of Fig. 2, Figs. 5, 6 and 7 are longitudinal sections taken on lines 5—5, 6—6 and 7—7 of Fig. 3, Figs. 8 and 9 are sections similar to that shown in Fig. 7, except that the expelling mechanism is shown at different expelling phases, Figs. 10 and 11 are longitudinal sections taken on line 10—10 of Fig. 6, but showing the elevating mechanism at different phases, Fig. 12 is a front elevation with parts being broken away of one form of coin control mechanism, that can be used in conjunction with the vending machine of the present invention, said mechanism being shown at the instant a coin has been dropped in the coin chute, Fig. 13 is a view of the coin control mechanism similar to that of Fig. 12, but showing said mechanism in position released by the coin, and Fig. 14 is a transverse section taken on line 14—14 of Fig. 12.

In the specific form of the invention shown, the vending machine comprises an outer cabinet shell 10, shown of rectangular cross-section, an inner shell or receptacle 11 extending substantially centrally in said outer shell, and also of substantially rectangular cross-section, and a filling 12 of suitable insulating material between said shells. The lower portion 13 of the inner receptacle 11 serves as a storage compartment for the vendible package A, while the upper end 14 serves as a compartment for a receiver 15, containing suitable refrigerant, desirably dry ice. This refrigerant receiver 15 is desirably of rectangular cross-section, and has its four peripheral walls constructed of material having low heat conductivity and its bottom wall of metal. This receiver 15 is shown diagrammatically in the drawings in one integral piece, although actually it would be made compositely, and its construction permits the temperature in the cabinet to be controlled by varying the amount of the bottom metal surface in contact with the dry ice, thus evaporating it at a rate which provides proper cabinet temperature. Although the bottom wall of the receiver 15 is shown perforated to permit the carbon dioxide gas to escape from said receiver, it has been found in actual practice that the machine will operate substantially the same if the walls of said receiver are imperforate.

For facility in mounting the inner receptacle 11 in position in the interior of the cabinet 10, said receptacle has an outward flange 16 at its upper end, seated on a shoulder formed around the sides of an opening 17, which is provided in a top wall 18 of said cabinet, and which affords access to the interior of said receptacle.

The refrigerant receiver 15 is provided with an outward flange 20 at its upper end, seated on the flange 16, and is accessible and easily removable through the cabinet opening 17. Suitable handles (not shown) are desirably provided for convenient handling of the refrigerant receiver 15 in or out of the receptacle 11.

The cabinet opening 17 is closed by a removable cover 21, desirably under lock and key, and having suitable gasket means (not shown) for hermetically sealing said opening.

Extending lengthwise in the package storage compartment of the receptacle 11 is a package magazine 25 of rectangular cross-section, spaced from three walls of said receptacle by suitable guide strips 26, secured to said walls as shown in Fig. 4, and from the fourth wall 27 by an outward lip 28 at the upper end of the corresponding wall of said magazine as shown in Fig. 6. The confined space 30 formed around the magazine 25 by these centering members 26 and 28 permits free circulation of the refrigerated gases in said space and around said magazine, and thereby assures proper and economical refrigeration of the packages in said magazine. This space 30 also serves to prevent the magazine 25 from becoming so frosted to the receptacle 11, that it cannot be easily removed therefrom.

The bottom of the magazine 25 is open, and has a pair of flanges 31, extending inwardly from the lower end of opposed walls of said magazine, the other two walls extending downwardly below said flanges to form standards 32 seated upon the bottom wall 33 of the receptacle 11 as shown in Fig. 2. These flanges 31 form a rest for the bottom layer of packages, which are shown arranged in the magazine 25 in three vertical columns or stacks.

The operation of replenishing the cabinet with packages is an easy matter. The empty magazine is removed from the cabinet through the opening 17, and a magazine which has been previously filled outside the cabinet is inserted in the storage compartment. This replenishment can be done so expeditiously that the loss of refrigeration in the cabinet attending such replenishment is very low.

On one side of the receptacle 11, and desirably forming a unit therewith is a downwardly inclined discharge chute 36, which communicates at its upper end with the interior of said receptacle, through a discharge opening 37 in a wall of said receptacle directly below the refrigerant receiver as shown in Fig. 6, and which terminates at its other end in an outlet on the side of the cabinet normally closed by a spring-pressed hinged door 38 shown in Fig. 2.

Any moisture which is carried by the air from the outside of the cabinet, and which finds its way into the receptacle 11 through the chute 36, will be deposited and frozen on the first cold surface it comes in contact with. In the present construction, this surface will be the bottom wall of the refrigerant receiver, which is easily removable, so that the frozen moisture can be defrosted before it interferes with efficient operation of the cabinet.

The stacks of refrigerated packages are moved upwardly step by step in the magazine 25 in response to the manipulation of an operating member shown in the form of a crank handle 40. This crank handle 40 is shown controlled from a suitable coin control mechanism 41, although as far as certain aspects of the invention are concerned, the vending machine need not be coin controlled, but may be under the supervision of a store attendant to whom the purchasing money is paid.

The elevator mechanism for moving the packages A upwardly step by step to bring the top layer opposite the opening 37 in discharge position therewith, includes a vertical feed or elevator bar 43 in the receptacle 11 on one side of the magazine 25, and a platform 44 slidably supported on said bar, and adapted to engage the bottom layer of packages and move the package columns upwardly in said magazine. This feed bar 43 comprises a pair of semicircular sections 45 and 46, arranged with their flat surfaces juxtaposed, and provided on adjoining sides with ratchet teeth 47 and 48 respectively. The platform 44 has a sleeve 50, loosely embracing the bar 43, and carries a pair of pivotally supported pawls 51 and 52, spring-pressed into engagement with the ratchet teeth 47 and 48 respectively. The lower end of the bar 43 is suitably journalled in a collar 39 at the bottom of the receptacle 11, and at its upper end in a suitable collar 39a, and one of the bar sections 45 is held against lengthwise movement by any suitable means as for instance a set screw 45a, threaded in said bar section 45, and extending through an elongated slot in the collar 39, to permit limited rotation of said bar section, while the other bar section 46 is oscillated vertically a short distance, equal at least to the distance between successive ratchet teeth upon operation of the crank handle 40.

Upon operation of the crank 40, the resultant upward movement of the bar section 46 causes the corresponding upward movement of the platform 44, through the interengagement of the pawl 52 on the ratchet teeth 48, while the other pawl 51 rides idly upwardly over the stationary ratchet teeth 47. Upon return downward movement of the bar 46, the pawl 51 having caught in the ratchet teeth 47 will prevent downward return movement of the platform 44.

At the point where the maximum height has been reached by the platform 44, the series of teeth on the bar section 45 ends. Further movements of the movable bar section 46 will only cause the platform 44 to rise and fall with said movable bar, since the pawl 51 will have no teeth to engage but will ride idly on the smooth part of the fixed bar section 45.

For oscillating the bar section 46 as described, there is provided a yoke 60 in the upper end of the receptacle 11 on one side of the refrigerant receiver 15 (Figs. 1, 6 and 7), journalled by trunnions in the side walls of said receptacle, and having a shaft 61 journalled at its outer end in a plate 62, which supports the coin control mechanism 41 as shown in Figs. 1, 2 and 3. This shaft 61 is desirably of composite fabricated construction, having a non-conducting hollow section between two metal cup sections, to prevent undue loss of refrigeration therethrough as shown in Fig. 3, and is driven from the crank 40 through a link transmission as will be hereinafter described. The insulation around this shaft 61 is desirably of soft pliable nature, such as kapok, mineral wool, or other material, which will compress loosely about said shaft without leaving voids causing refrigeration leakage along said shaft.

Pivotally connected to the cross bar 63 of the yoke 60 is one end of a bifurcated coupling member 64, the other forked end being connected to the upper end of the bar section 46, extending above the upper end of the bar section 45 as shown in Figs. 1 and 6. The connection between the coupling member 64 and bar section 46 is removable to permit limited rotation of the two bar sections 45 and 46, and for that purpose comprises a pin 65 and cotter pin 66. When it is desired to return the platform 44 to its lowermost position preliminary to refilling of the storage compartment, the pins 65 and cotter pin 66 are removed, the coupling member 64 swung about its upper pivotal mounting to clear the bar section 46, and the two bar sections 45 and 46 rotated slightly to present a smooth surface to the pawls 51 and 52. This permits the platform 44 to drop by gravity into its lowermost position.

In this lowermost position, the platform 44 rests on the bottom wall of the receptacle, with its upper package supporting surface extending through the bottom opening of the magazine and above the magazine flanges 31. With this construction, when the loaded magazine 25 is lowered to its full depth in the receptacle 11, the weight of the articles or packages will be transferred from the magazine 25 to the platform 44. This platform 44 is of open construction, comprising essentially three parallel ribs 63, and is centered in the receptacle 11 as it reaches the bottom thereof by an upstanding triangular plate 70, secured to the bottom wall of said receptacle parallel to opposed side walls of said receptacle as shown in Figs. 2 and 4. As the platform 44 descends, two adjacent ribs 63 riding over the inclined edges of the triangular plate 70 cause said platform to rotate about the feed bar 43, until said platform is in centered position.

The package expelling mechanism, which occupies a minimum amount of space even during operations, is disposed between the bottom of the refrigerant receiver 15 and the top of the package magazine opposite the discharge opening 37, and is operated from the crank 40 simultaneously with the step by step operation of the elevator mechanism, and in such a manner as to effect discharge of the packages neatly and efficiently without marring the packages. This mechanism includes a slide 75 in the receptacle 11, disposed directly below the refrigerant receiver 15, and supported on a pair of rails 76 connected respectively to opposed side walls of said receptacle as shown in Figs. 2, 3 and 5. This slide 75 is oscillated along the rails 76 by a pair of side arms 77, depending from the ends of the yoke 60 and flanking said slide. Each of these yoke arms 77 has a groove 78 extending lengthwise thereof, and engaging a pin 80 on the corresponding side of the slide 75 as shown in Figs. 1, 2, 6 and 7. These grooves 78 are opened at their upper end as shown to permit the package expelling mechanism, including the slide 75, to be lifted from the receptacle 11 and out of the cabinet for magazine replenishment.

As the crank 40 is rotated, the yoke 60 is oscillated about its trunnion supports, to cause angular oscillation of the yoke arms 77, and corresponding back and forth movement of the slide 75.

Carried by the slide 75 are two similar sets of package expelling fingers, each including three fingers 81, 82 and 83, pivotally supported at one end on a rod 84 extending between the forward ends of a pair of frame extensions 85 on said slide. The extent of angular movement of the expelling fingers 81, 82 and 83 about the rod 84 is limited by lugs 86, extending upward from said fingers respectively, and having segmental slots through which extends a rod 87 on the slide 75.

The three fingers 81, 82, and 83 of each set are of different progressive lengths and terminate at their rear ends in catches 90, adapted to separately engage the rear sides of the packages to be expelled. The packages A are arranged in three adjoining stacks or columns, the top supporting surface of the platform 44 being stepped, so that the three packages of each layer are stepped with the package nearest the discharge chute 36 at the lowest level.

In one phase of the operation of the expelling mechanism, the upper layer of packages A', A$^2$ and A$^3$ will be in position shown in Fig. 6, and the two longest fingers 83 will be in their lowermost angular position with the catches or hooks 90 of said fingers behind the package A$^3$, and the catches 90 of the other fingers 81 and 82 resting inactively on the top of the packages A$^2$ and A$^3$.

Upon rotation of the crank 40 one-half revolution, the slide 75 will move forwardly as described, thereby causing the two fingers 83 to push the package A$^3$ forwardly, which in turn pushes the other two packages A' and A$^2$, until the forward package A' drops into the chute 36 as shown in Fig. 7. During this operation, the catches 90 on the fingers 81 and 82 rest on the two packages A$^2$ and A$^3$.

Upon continued rotation of the crank 40 through the other half revolution, the slide 75 returns to the position shown in Fig. 8, until the two fingers 82 of intermediate length drop into their lowermost angular position with their catches 90 behind the package A$^3$. During this return movement, the catches 90 of the shortest fingers 81 ride idly over the two remaining packages, the step formation of these packages permitting this return movement without the seizing of said catches.

During the rotation of the crank 40 through a cycle as described, the elevator mechanism will have been operated to lift the packages one step.

Upon the next rotating cycle of the crank 40, the slide 75 will move forwardly again, and the catches 90 of the fingers 82 engaging the rear side of the package A$^3$ will move the two packages A$^2$ and A$^3$ forwardly, until the package A$^2$ drops in the chute 36. Upon return movement of the slide 75, the catches 90 of the shortest fingers 81 will drop behind the package A$^3$ as shown in Fig. 9, so that upon the next forward movement of the slide 75, this package A$^3$ will be expelled. During this second cycle, the packages will have been raised another step, so that upon completion of the return movement of the slide 75 from its expelling action on the package A$^3$, the next succeeding layer will be in the position formerly occupied by the packages A', A$^2$ and A$^3$ shown in Fig. 6, and the fingers 81, 82 and 83 in corresponding position shown.

The coin control mechanism per se forms no part of the present invention, and may be of any suitable construction, and may even be eliminated if desired without departing from the scope of certain aspects of the present invention. In Figs. 12, 13 and 14 is shown for the purpose of illustration one well-known type of coin control mechanism that can be used. In this construction, there is provided a pivoted trip 100, engaging a spring-pressed catch 101, which is loosely mounted on the shaft 102 of the crank handle 40, and which forms one element of a clutch assembly. This catch 101 has a lug 103 for clutch engagement as will be described, and has connected thereto for rotation therewith an eccentric 104, which rotates the yoke shaft 61 through links 105 and 106.

The other clutch element 107 is affixed to the shaft 102 of the crank handle 40, and carries a lug 108 for clutch engagement with the lug 103 on the catch 101.

When the coin control mechanism is not released for operation, the catch 101 will be in engagement with the trip 100 as shown in Fig. 12, and the lug 103 of said catch will be out of the rotary path of the lug 108 on the clutch element

107. Upon the insertion of coin B, the trip 100 will be cammed out of engagement with the catch 101, which when released will rotate clockwise under the action of the spring 110, to move the lug 103 radially inwardly into the path of rotation of the lug 108 as shown in Fig. 13, while the coin B drops into a suitable box (not shown). Rotation of the crank shaft 102 will cause rotation of the clutch element 107, and in turn rotation of the clutch element or catch 101 through interengagement of the lugs 103 and 108, so that the eccentric 104 will be rotated. Before the crank 49 has completed its revolution, the trip 110 will return to position shown in Fig. 12, to engage the catch 101 and disengage the clutch.

By proper adjustment, the machine of the present invention may be used to dispense anything in the frozen products line, such as ice cream in bars or in bulk form, and frozen foods such as vegetables, meats and fish in package form. The machine may be constructed in as many multiple units as desired, and these may be of such size as to dispense many different sizes of packages respectively.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described our invention, what we claim as new and desire to secure by Letters Patent is:

1. In a machine for dispensing refrigerated articles, the combination comprising a cabinet, a receptacle in said cabinet, a magazine removably supported in said receptacle, adapted to hold therein a stack of the articles to be dispensed, and having an opening at the bottom and one or more inwardly extending flanges bordering said opening and forming a seat for said stack, said magazine being adapted to be loaded outside said cabinet, and forming with the articles loaded therein a unit, which can be inserted as such in said receptacle after removal of the empty magazine from said receptacle, a discharge chute, and means for feeding said stack upwardly step by step in said magazine to bring the articles successively in discharge position with respect to said chute, said means including a platform adapted to engage the bottom article of said package, and smaller than said magazine opening to permit free passage of said platform therethrough.

2. In a machine for dispensing refrigerated articles, the combination comprising a cabinet, means for supporting a stack of the articles to be dispensed in said cabinet, a discharge chute, means for feeding said stack upwardly step by step to bring the articles successively in discharge position with respect to said chute, and including an upright feed bar, and a platform on said bar movable upwardly therealong, and adapted to support the stack, and means for sliding said platform downwardly along said bar into its lowermost position and solely by the action of gravity on said platform to receive a fresh stack.

3. In a machine for dispensing refrigerated articles, the combination comprising a cabinet, means for supporting a stack of the articles to be dispensed in said cabinet, a discharge chute, means for feeding said stack upwardly step by step to bring the articles successively in discharged position with respect to said chute, and including an upright rotatable feed bar, and a platform on said bar movable upwardly therealong, and adapted to support the stack, and means operable when said bar is rotated about its axis from feeding position to permit said platform to slide downwardly along said bar into its lowermost position and solely by the action of gravity on said platform to receive a fresh stack.

4. In a machine for dispensing refrigerated articles, the combination comprising a cabinet, means for supporting a stack of the articles to be dispensed in said cabinet, a discharge chute, and means for feeding said stack upwardly step by step to bring the articles successively in discharged position with respect to said chute, and including an upright rotatable feed bar having ratchet teeth arranged lengthwise of said bar along one side, and a platform on said bar for supporting the stack, movable upwardly along said bar, and carrying a pawl for cooperation with said ratchet teeth, said bar being released for rotation about its axis to move the ratchet teeth thereof out of engagement with said pawl, and to permit said platform to gravitate downwardly into its lowermost position to receive a fresh stack.

5. In a machine for dispensing refrigerated articles, the combination comprising a cabinet, means for supporting a stack of the articles to be dispensed in said cabinet, a discharge chute, and means for feeding said stack upwardly step by step to bring the articles successively in discharge position with respect to said chute, and including a pair of adjacent bar sections, each having a set of ratchet teeth arranged lengthwise thereof along one side, a platform on said bar for supporting the stack, and carrying a pair of pawls co-operating with said ratchet teeth sets respectively, and means for reciprocating one of said bar sections lengthwise.

6. In a machine for dispensing refrigerated articles, the combination comprising a cabinet, means for supporting a stack of the articles to be dispensed in said cabinet, a discharge chute, and means for feeding said stack upwardly step by step to bring the articles successively in discharged position with respect to said chute, and including a pair of bar sections of semi-circular cross-section respectively, having their plane surfaces juxtaposed and having a set of ratchet teeth arranged lengthwise thereof along one side, a platform on said bars for supporting the stack, and carrying a pair of pawls co-operating with said ratchet teeth respectively, and means for reciprocating one of said bar sections lengthwise, said bar sections being rotatable together to move the ratchet teeth thereof out of engagement with said pawls, and to permit said platform to gravitate downwardly into its lowermost position to receive a fresh pack.

7. In a machine for dispensing articles, the combination comprising a cabinet, a receptacle in said cabinet, adapted to hold a stack of the articles to be dispensed, a discharge chute, means for feeding said stack upwardly step by step to bring the articles successively in discharge position with respect to said chute, and including an upright feed bar, and a platform adapted to support the stack, and having a sleeve rigid therewith loosely encircling said bar, said platform being movable step by step upwardly along said bar, means for returning said platform downwardly in its lowermost position to receive a fresh pack, and means for rotatively centering said platform about said feed bar, and with respect to the cross-section of said receptacle during this downward movement of said platform.

8. In a machine for dispensing articles, the combination comprising a cabinet, a discharge chute, means for supporting a stack of the articles to be dispensed in said cabinet, means for moving said stack upwardly step by step to bring the top article into discharge position with respect to the inlet of said chute, and means for expelling said articles successively from the top of the stack to said chute inlet, and including a pivotally supported finger, reciprocable across the top of said stack towards and away from said chute inlet, and having a catch at one end adapted to engage the rear side of the top article during the movement of said finger towards said inlet.

9. In a machine for dispensing articles, the combination comprising a cabinet, a discharge chute, means for supporting a plurality of juxtaposed stacks of the articles to be dispensed in said cabinet, said stacks being arranged one behind the other away from the inlet of said chute, means for moving said stacks upwardly in unison step by step to bring the top articles into discharge position with respect to the inlet of said chute, and means for expelling said articles successively from the top of the stacks to said chute inlet, and including a plurality of fingers, corresponding in number to the number of stacks, and reciprocable in unison across the top of said stack towards and away from said chute inlet, and means effecting expelling engagement of said fingers successively with the rear top article during respective movements of said fingers towards said inlet.

10. In a machine for dispensing articles, the combination comprising a cabinet, a discharge chute, means for supporting a plurality of juxtaposed stacks of the articles to be dispensed in said cabinet, said stacks being arranged one behind the other away from the inlet of said chute, means for moving said stacks upwardly in unison step by step to bring the top articles into discharge position with respect to the inlet of said chute, and means for expelling said articles successively from the top of the stacks to said chute inlet, and including a plurality of fingers of progressive lengths corresponding in number to the number of stacks, and reciprocable in unison across the top of said stack towards and away from said chute inlet, said fingers terminating at one end in respective catches, and means effecting expelling engagement of the catch ends of said fingers successively with the rear side of the rear top article during respective movements of said fingers toward said inlet.

11. In a machine for dispensing articles, the combination comprising a cabinet, a discharge chute, means for supporting a plurality of juxtaposed stacks of the articles to be dispensed in said cabinet, said stacks being arranged one behind the other away from the inlet of said chute, and stepped upwardly from said inlet, means for moving said stacks upwardly in unison step by step to bring the top articles into discharge position with respect to the inlet of said chute, and means for expelling said articles successively from the top of the stacks to said chute inlet, and including a plurality of pivotally supported fingers of progressive lengths corresponding in number to the number of stacks, and reciprocable in unison across the top of said stack towards and away from said chute inlet, said fingers terminating at one end in respective catches, and means effecting expelling engagement of the catch ends of said fingers successively with the rear side of the rear top article during respective movements of said fingers towards said inlet.

12. In a machine for dispensing refrigerated articles, the combination comprising a cabinet having an opening at the top, a receptacle in said cabinet, a magazine with a bottom opening supported in said receptacle and adapted to hold therein a stack of the articles to be dispensed, a discharge chute, means for feeding said articles upwardly step by step in said magazine to bring said articles successively in discharge position with respect to said chute, and including a platform adapted to ride upwardly in the interior thereof and to support the articles in said magazine, and means having portions thereof extending across the top of said magazine for expelling the articles from said discharge position into said chute, said magazine being removable from said receptacle through said cabinet opening and being adapted to be loaded outside said cabinet, said platform being sufficiently small to permit free relative passage thereof through said magazine opening when said magazine is removed upwardly from said receptacle, and said portions of the expelling means being also removable to permit removal of said magazine through said cabinet opening.

13. In a magazine for dispensing refrigerated articles, the combination comprising a cabinet, means for supporting a stack of the articles to be dispensed in said cabinet and including a platform, a discharge chute, an upstanding bar member, said platform being mounted on said bar member for movement therealong, means for reciprocating said bar lengthwise, and means responsive to said reciprocation for moving said stack upwardly along said bar member step by step to bring the articles successively in discharge position with respect to said chute.

ROBERT F. EDDY.
EMIL W. MOELLER.
RALPH R. WILCOX.
ALLAN F. EDDY.